United States Patent [19]

Gerin

[11] 3,934,668
[45] Jan. 27, 1976

[54] LIGHTWEIGHT HIGH PERFORMANCE, HIGH SECURITY VEHICLE

[76] Inventor: Jacques Jean-Marie Jules Gerin, Chatellenot, Pouilly-en-Auxois, Cote d'Or, France

[22] Filed: Nov. 20, 1973

[21] Appl. No.: 417,544

[30] Foreign Application Priority Data
May 5, 1972  France .............................. 72.16157

[52] U.S. Cl. .............. 180/21; 180/1 FV; 180/89 R; 244/110 D; 296/1 S; 280/87 B
[51] Int. Cl.² ......................................... B62D 61/00
[58] Field of Search .......... 280/87 R; 180/1 FV, 21, 180/89; 296/1 S; 244/110 D

[56] References Cited
UNITED STATES PATENTS

| | | | |
|---|---|---|---|
| 1,956,313 | 4/1934 | Capelis | 244/110 D |
| 3,298,707 | 1/1967 | Gerin | 280/87 R |
| 3,539,030 | 11/1970 | Gerin | 180/89 R |
| D94,287 | 1/1935 | Taylor | 296/1 S |

FOREIGN PATENTS OR APPLICATIONS

| | | | |
|---|---|---|---|
| 2,027,099 | 12/1970 | Germany | 296/1 S |
| 200,516 | 12/1955 | Australia | 180/89 R |

*Primary Examiner*—Leo Friaglia
*Assistant Examiner*—John P. Silverstrim
*Attorney, Agent, or Firm*—Karl W. Flocks

[57] ABSTRACT

A lightweight vehicle giving very high performances but affording a considerable degree of security for young athletic customers. It includes an aerodynamic cockpit protected by the spare-wheel and two lateral shields.

Both occupants take places on two seats disposed tandem-fashion. An horizontal stabilizer extending on either side of the rear point of the cockpit ensures a perfect stability while an aerodynamic brake disposed at the upper part of said horizontal stabilizer affords a great security.

5 Claims, 19 Drawing Figures

LIGHTWEIGHT HIGH PERFORMANCE, HIGH SECURITY VEHICLE

The present invention relates to a lightweight vehicle giving very high performances but affording a considerable degree of security, more particularly designed for young, athletic customers.

This vehicle is a hybrid between two-seater motorcycles which are rapid and suitable for competition but which are very uncomfortable and, in particular, extremely dangerous, on one hand, and conventional classical automobiles which are generally fragile and lack sufficient power for good performances when they are within a price range compatible with the finances of the purchasers.

The Applicant has made a synthesis of the new concepts made possible by recent progress in aerodynamics, the application of new materials used in architecture and the well known permanent bases. The present inventor has U.S. Pat. Nos. 3,298,707 and 3,539,030 also directed to such vehicles. These vehicles and the present invention have in common the basic concept of comprising a body of tapered shape, the front part forming the large end of which is well rounded, the master couple of which is placed substantially in the first third of the total length of the vehicle, the front end of which is occupied by the spare wheel which is mounted on a shaft firmly secured to the vehicle and is combined with two side shields very strong and resistant in the horizontal plane, smooth and devoid of asperities.

Each of the patents concerns a particular construction seeking to resolve a specific problem. In U.S. Pat. No. 3,298,707 there is above all resolved the problem of stability by means of a central body provided on either side with two wing portion arranged one behind the other and offset one with respect to the other, these wing portions having a negative aerodynamic lift which balance at any moment the position lift of the central body. U.S. Pat. No. 3,539 resolves the problem of a vehicle just as capable of carrying the conductor alone as a large number of passengers with numerous baggage at high speed and in full security without the equilibrium of the vehicle being disturbed.

The present invention resolves the problem of a lightweight vehicle giving very high performances but affording a considerable degree of security, more particularly designed for young, athletic customers.

In addition to the means employed in the basic concept mentioned above, are combined the following:

The rear wheels are separate from the cockpit and housed at the two extremities of a profiled transverse appendix extending on either side of the rear point of the cockpit and forming a horizontal stabilizer;

two seats are disposed tandem-wise inside the cockpit; and an aerodynamic brake constituted by flaps pivotable about a transverse pin located behind the horizontal appendix and disposed on the upper side of same, said flaps being controlled by the driver, when the vehicle speed is sufficient for aerodynamically acting braking to be efficient.

Owing to this synthesis, the Applicant has been able to design a vehicle that is extremely rapid but which is of medium power, owing to its aerodynamic properties and lightness; it is very robust and shock resistant owing to its enveloping structure and its frontal and lateral shields; it is very stable and reliable owing to its tail stabilizer unit and aerodynamic braking system and its ability to lean into bends in order to cancel out the effects of centrifugal force, in the same way as a motorcycle.

For this purpose, the vehicle comprises a streamlined cockpit the front portion of which is well rounded, both horizontally and vertically, and whose maximum cross-section is located substantially in the front third of the total length of the vehicle and which is perfectly circular.

The two front wheels are integrated inside the rounded front portion assembly while the two rear wheels are, on the contrary, separate from the cockpit and housed at the two extremities of a profiled transverse appendix extending on either side of the rear point of the cockpit and forming a horizontal stabilizer.

This horizontal stabilizer is completed by vertical stabilizers forming fins located respectively above the cockpit and at the two extremities of the horizontal stabilizer.

Two seats are disposed tandem-wise inside the cockpit, the driver's seat being at the point of maximum cross-section, with the provision of a framework constituted by a self-supporting main box-girder protecting the two occupants and a light truss forming a multi-tubular system with which the cockpit bodywork, the transverse appendix and the fins are integral.

Finally, there is an aerodynamic brake constituted by flaps pivotable about a transverse pin located behind the horizontal appendix, controlled by the driver, when the vehicle speed is sufficient for aerodynamically acting braking to be efficient.

Other characteristics, advantages and features of the present invention will become clear from the following description given with reference to the attached diagrams representing a possible form of embodiment of said invention by way of a purely explanatory and in no way limitative example.

Generally speaking it is immediately clear from FIGS. 1 to 4 that the vehicle according to the invention has a rigorously perfect shape aerodynamically.

Figure 1:
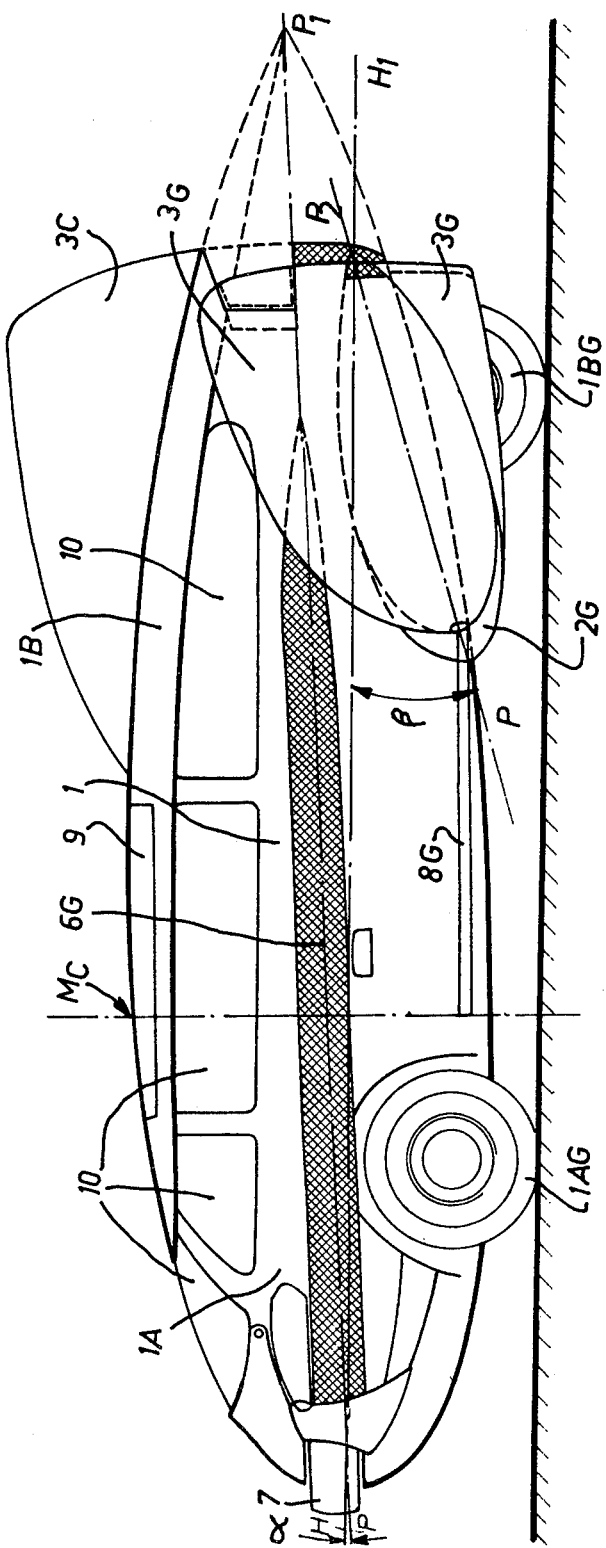
FIGS. 1 to 4 represent respectively an elevation, top, front and rear view of a vehicle according to the present invention.
Figure 2:
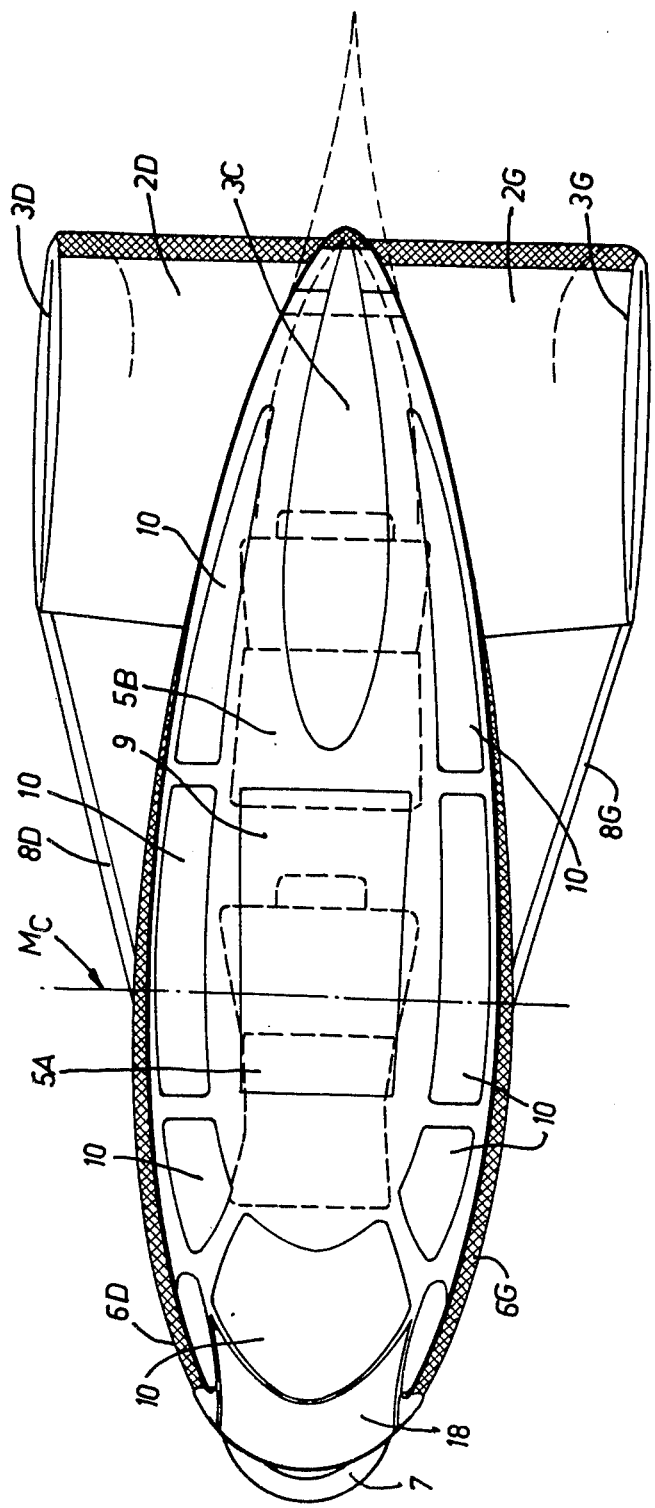

Indeed, the body forming the cockpit designated by general reference number 1 comprises a forward portion $1_A$ that is well rounded, both in the vertical plane (see FIG. 1) and in the horizontal plane (see FIG. 2).

The maximum cross-section $M_C$ is located in the front third of the total length of the vehicle, and its cross-section $S_C$ is that of the substantially perfect circle.

The median and rear portions of the body, designated by general reference $1_B$ which occupy the remaining two thirds of the total vehicle length, possess, on the contrary, a tapered shape, only the trailing point of which is truncated to receive the registration plate.

It should be noted that the two front wheels of the vehicle 1AG and 1AD are completely integrated inside the overall volume of front portion $1_A$.

On the contrary, rear wheels 1BG and 1BD are housed, for reasons which will be explained in detail subsequently, at the two extremities of a profiled transverse appendix extending on either side of the rear point of the cockpit, and which will simply be designated by general reference numbers 2G, 2D for the time being.

Before pursuing the description, it is immediately noticeable that cockpit 1, viewed from the top, has the shape of a body capable of good penetration through the air and, in elevation view, the shape of a thick wing profile the elongation of which is approximately the ideal elongation 4.

To prevent the vehicle from taking off at high speed, particularly when it is subject to the vertical accelerations resulting from bumps in the road, the cockpit-body 1 is set in such a way that its normal attitude $PP_1$ has a slightly negative angle $\alpha$, for example in the order of $-3°$, in relation to the horizontal plane $HH_1$.

Furthermore, in order to obtain perfect road holding from drive wheels IBG, IBD, the longitudinal cross-section of transverse appendix 2G, 2D, previously mentioned, is given the profile of a thick wing matching that of the cockpit properly speaking, but with a far more marked contra-lifting effect than that of said cockpit.

For this purpose, appendix 2G, 2D is set in such a way that its normal attitude $PP_2$ has a markedly negative angle $\beta$, for example in the order of $-18°$, in relation to the horizontal plane $HH_1$. This appendix somewhat constitutes a negatively set horizontal stabilizer.

Furthermore, three vertical stabilizers are provided, one 3C in the center and above the rear extremity 1B of the cockpit, the other two 3G and 3D at the two extremities of horizontal stabilizer 2G, 2D.

It should be pointed out that the assembly constituted by this horizontal stabilizer and the three fins forming vertical stabilizers, can be likened to the tail stabilizer unit of a dirigible balloon whose fuselage is constituted in this case by cockpit 1.

Aerodynamically speaking, the vehicle according to the invention, apart from its air penetration qualities which are excellent owing to a very low air resistance factor $C_x$ in the order of 0.12 to 0.15, has the prime advantage of being perfectly stable, and, consequently, unaffected by the particularly prejudicial action of cross winds. In fact, owing to the tail stabilizers, the resultant of the aerodynamic forces is applied at a point well behind the center of gravity and the vehicle is consequently autostable.

Furthermore, the vehicle is also mechanically stable, as the resultant of the action of the wheels on the ground is applied at a point located behind the center of gravity.

Owing to its aerodynamic qualities, its small height, its extremely small ground clearance, its small wheel base, the vehicle can be displaced by a low power engine (not represented) disposed just ahead of the geometrical axis of rear wheels 1BG, 1BD, while having a very low center of gravity located practically in the front third of the total vehicle length, i.e., practically at the maximum cross-section $M_C$. Furthermore, the vehicle can reach very high speeds in complete security.

Figure 5:
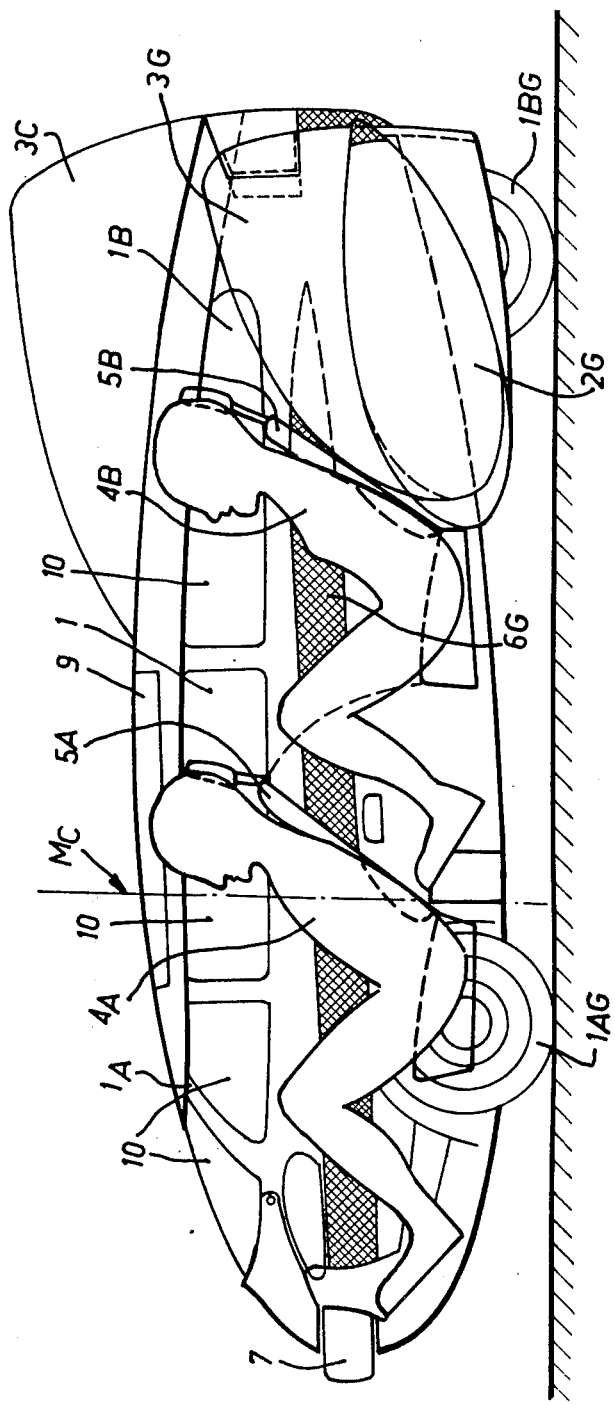
FIG. 5 is an elevation view of the vehicle, analogous to that in FIG. 1, but showing the silhouettes of the two occupants in their seats.

As the vehicle according to the invention is destined, as already seen to very young, athletic clients fresh from their experience of motorcycles and, consequently, usually favouring two-seaters, it will automatically adopt the solution recommended by the Applicant, which appears very clearly from FIGS. 2 and 5.

This consists, on one hand, in housing the two occupants, whose silhouettes are diagrammatically represented at $4_A$ and $4_B$, behind one another on two seats 5A and 5B disposed tandem-fashion, and on the other hand, in protecting these occupants extremely efficiently, as will be described in detail subsequently with reference to FIGS. 6, 7 and 8, by means of a protective robust smooth shield constituted by two lateral members 6G, 6D disposed on the sides of the vehicle and by spare wheel 7, forming an impact deflector. Furthermore, two very robust outer tubes, for example of steel, 8G and 8D, are anchored between the base of cockpit 1, at the level of the maximum cross-section and the respective bases of lateral fins 3G, 3D.

Owing to this design, the vehicle does not risk running foul of obstacles but quite to the contrary can ricochet against them. Head-on impacts, which are the most fatal, are thus completely eliminated.

The two seats 5A, 5B are naturally provided with markedly rearward reclining backs so as to have as small a maximum cross-section $M_C$ as possible. Furthermore, front seat $5_A$ at least has a forward folding back so as to enable the occupants of the rear seat, first, and then the driver, to take his seat inside the vehicle through a pivoting hatch 9 disposed on the roof of cockpit 1.

Wide curved bay windows 10 are provided all along the upper portion of the cockpit and enable the occupants to enjoy an excellent panoramic view, forwards and laterally and to the rear of the vehicle.

Furthermore, the vehicle is advantageously provided with an adjustable suspension of the type described in the Applicant's U.K. patent 1,240,147 and U.S. Pat. No. 3,539,030.

Figure 3:
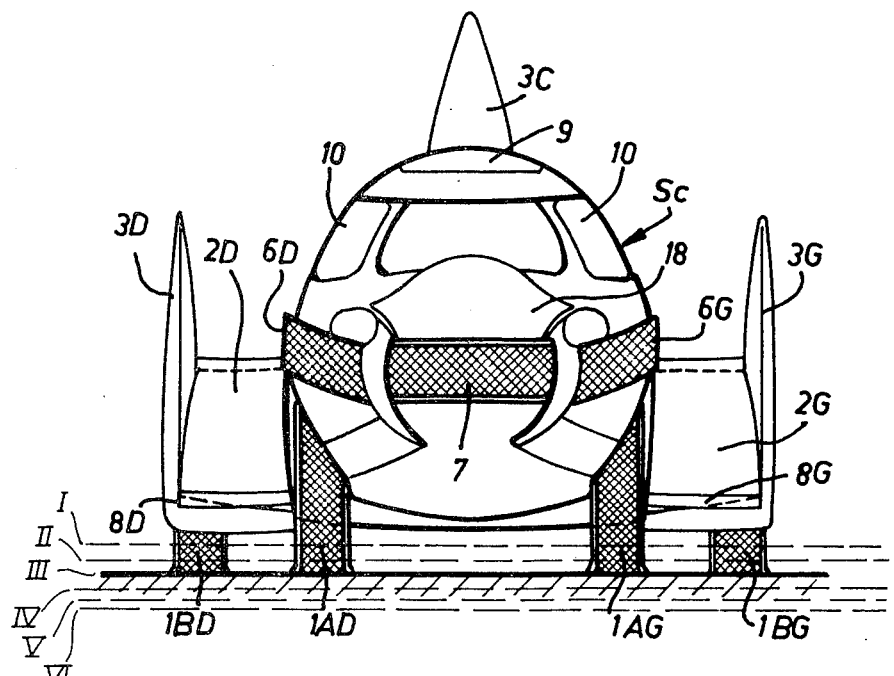
Figure 4:
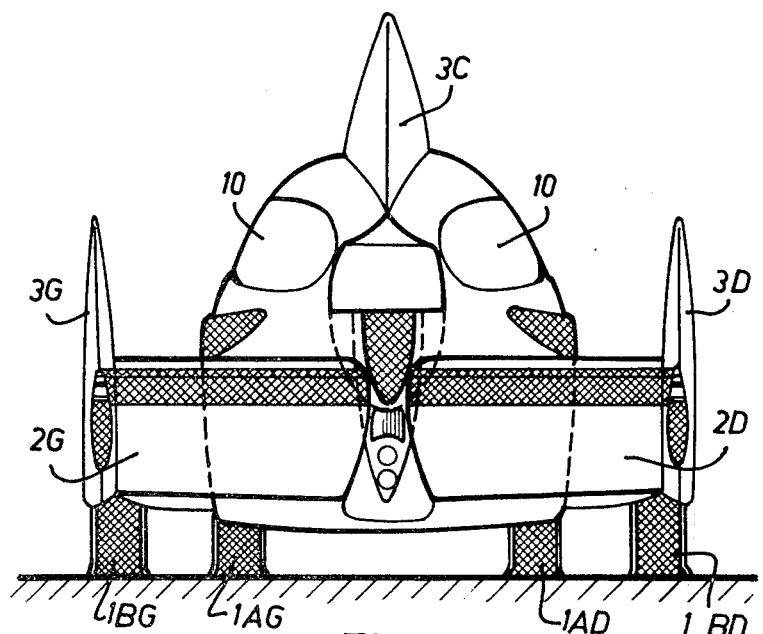

As a brief reminder, by means of this adjustable suspension, the vehicle can occupy six different ground clearance levels diagrammatically represented in FIG. 3 by the six lines referenced 1 to 6, corresponding respectively to the following different vehicle positions: very low for I; motor way for II; highway for III; dirt roads for IV; very high for V; and ultra-high for VI. Ground clearance can be selected by the driver by means of a special control.

This suspension also makes it possible, as will be seen in detail subsequently, to cause the vehicle to lean into the bends to cancel out the effect of centrifugal force.

As regards the structure of the vehicle itself, it can be generally defined as being of the multi-tubular chassis type with a light weight alloy or plastic bodywork cladding said chassis and integral therewith.

More specifically, in order to obtain efficient protection for the occupants as well as good bodywork rigidity for a reasonable price, the base of said chassis is constituted using the cemented lamellated wood technique that has now been used for a certain time in the building industry.

Practically speaking (see FIG. 6), the vehicle framework is constituted by: a self-supporting protective box type truss girder made of wood and designated by general reference number P; a truss of light alloy anchored in the girder and serving as a substrate for the bodywork, designated by general reference T; and a light alloy or plastic bodywork cladding the girder and the truss, designated by general reference C.

More particularly, and by way of a non-limitative example represented in FIGS. 6, 7 and 8, the constituents P, T and C above can be designed as follows:

Girder P is advantageously constituted by:

two lower side-members 10G, 10D, curved upwardly at their front extremities in order to constitute a front shield 11 in which is anchored a housing 12 receiving impact-deflecting spare wheel 7 which is itself mounted idle on a pivot pin 12A solidly attached to housing 12;

two upper side-members constituting lateral shields 6G, 6D, mentioned above, which are anchored, by their front extremities, to front shield 11;

transverse reinforcing pairs disposed respectively at the front of the vehicle at 13, at the level of the maximum cross-section at 14, and just ahead of the tail stabilizer unit at 15.

Figure 6:
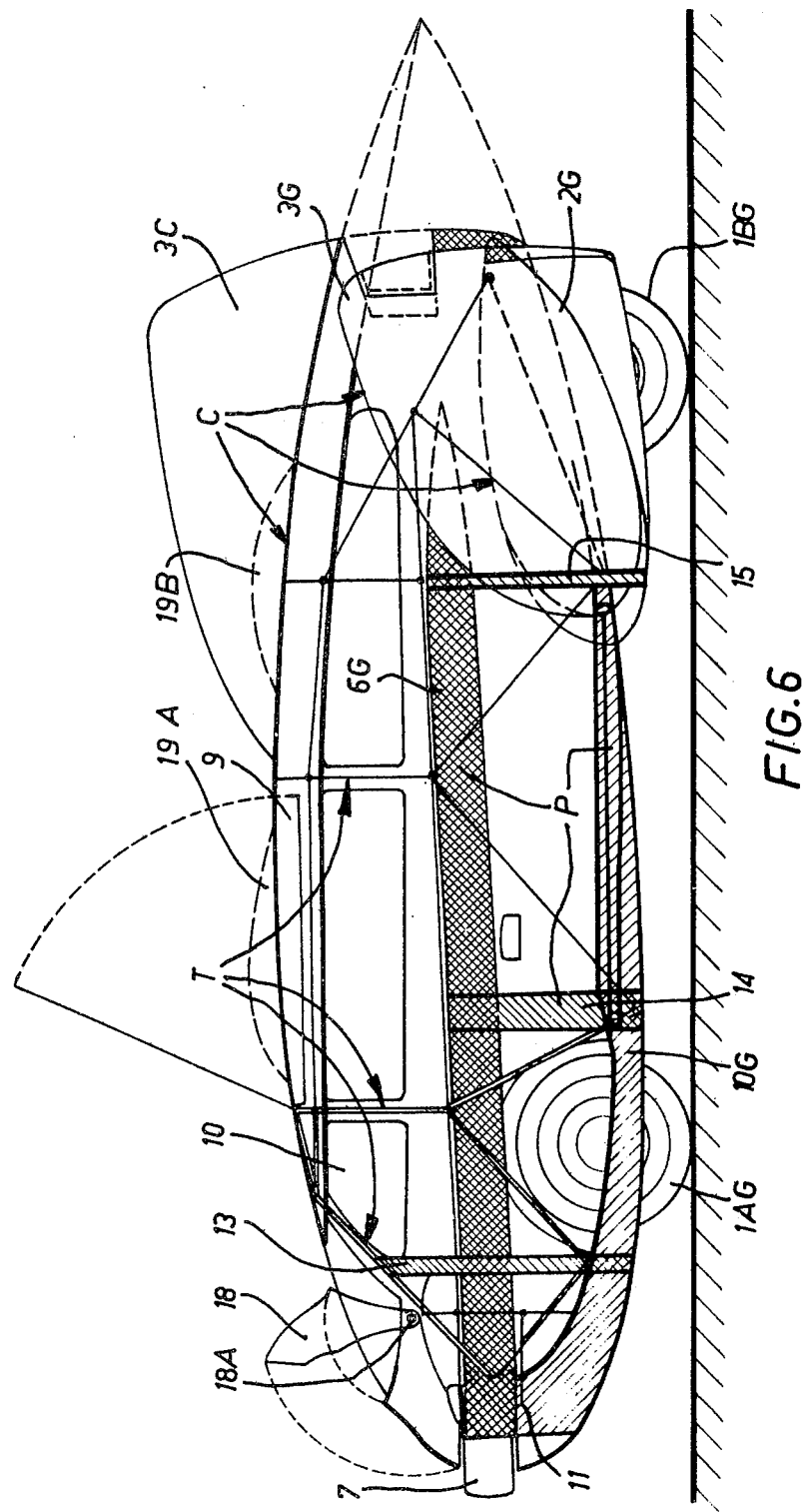
FIGS 6 and 7 are explanatory diagrams showing the arrangement of the internal structure of the vehicle, the latter being represented respectively viewed in elevation and from the top.
Figure 7:
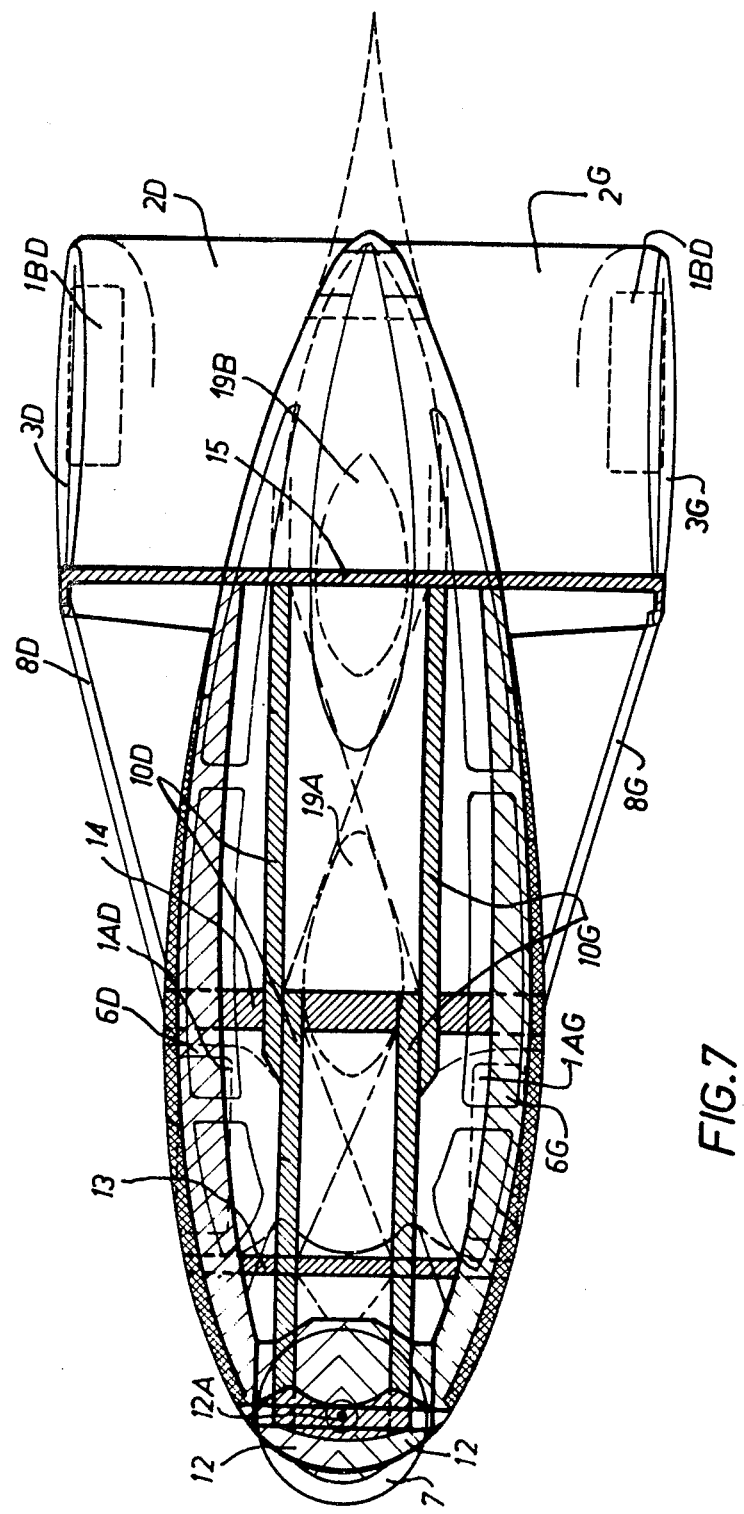

Truss T is constituted in a manner known per se by a system of steel or light alloy tubes appropriately triangulated as clearly seen from the diagram of FIG. 6. Naturally, the different nodal points of the system are disposed at suitable locations and serve as anchor points.

Bodywork C is constituted: either of light alloy sheets such as those known commercially under the names: "DURALUMIN" and "DURALINOX," or of a laminated plastic cladding. The sheets or plastic cladding are made integral as known "per se" with truss T.

It should, however, be pointed out that a shield 18 articulated at 18A and constituted by a resistant sheet metal enables the front portion of the cockpit located above deflecting spare wheel 7 to be capped and protected.

Furthermore, bulbs 19A and 19B can advantageously be provided on the roof of the cockpit, respectively over hatch 9 and over the tapered portion of the cockpit located under central fin 3C. These bulbs allow the occupants greater ease of movement, more particularly if they wish to take part in a competition and are consequently obliged to wear helmets.

Figure 8:
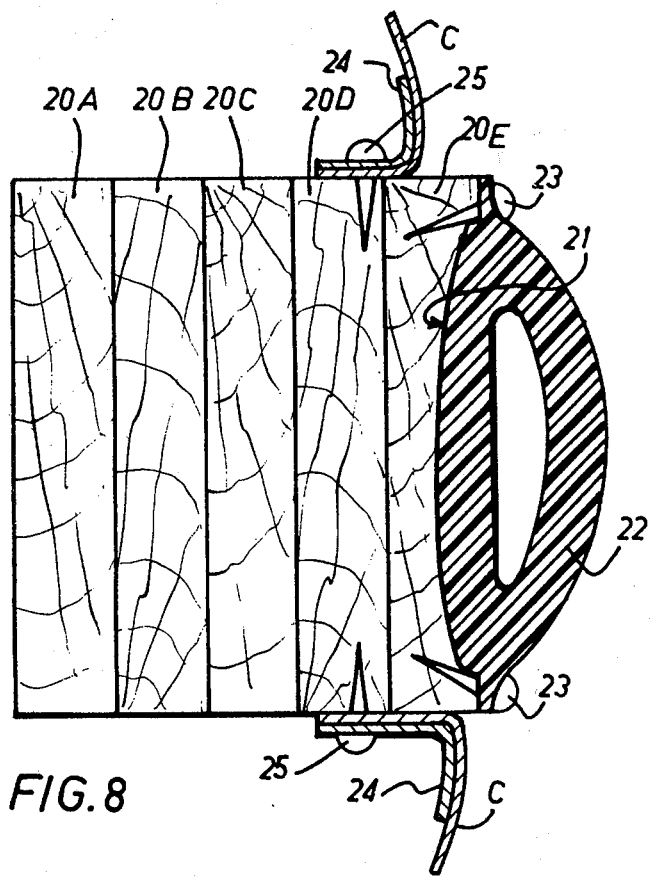
FIG. 8 is a larger scale detail representing the way in which the shield laterally protecting the structure can be fitted.

According to a particularly advantageous form of embodiment, each of the lateral protective shields 6G and 6D can be constituted, as represented in the cross-section of FIG. 8, by a certain number of strips, for example five, referenced $20_A$, $20_B$, $20_C$, $20_D$ and $20_E$ of low density resistant wood. These strips are shaped according to the required curvature and then cemented to one another so as to form a perfectly homogeneous unit.

A recess 21 is provided on the outer strip, $20_E$ in this case, and a soft rubber cushion 22 affording protection against slight impacts is cemented in said recess.

Cushion 22 attachment can be reinforced along its periphery by suitably distributing attachments such as 23.

Assembly between wooden girder P and the members of the metallic truss is by means of metallic collars.

Bodywork members C can be attached to the shield, for example by means of longitudinal angle irons such as 24, which are themselves attached by means of attachments such as 25, suitably distributed along strip $20_D$ in this particular case.

According to another basic characteristic of the present invention, the front portion of the vehicle is equipped with aerodynamic brakes which considerably increase the security conditions when driving at high speeds.

Before describing the means enabling the design of aerobrakes by making full use of the very particular characteristics of vehicle according to the invention, a brief reminder will be given of the advantages of such aerodynamic brakes.

While it is difficult for conventional drum or disk brakes to retain their efficiency when the speed at which the vehicle is used increases, if only owing to the difficulty of discharging the calories generated by their prolonged use, the case of a brake using only air resistance is quite different. First of all, it should be noted that such a brake does not heat up, however long it is used. Furthermore, as air resistance increases as a square of the speed, it becomes extremely efficient, even for speeds commonly reached on the roads by present vehicles and more particularly by a vehicle according to the present invention.

Furthermore, as the aerobrake according to the invention is disposed, as will be described hereinafter, at the very rear of the vehicle, it increases the stability of the vehicle during braking in somewhat the same manner as the tail chute of an aircraft.

Furthermore, as the aerobrake has a contra lifting effect, it markedly increases the road holding of the rear drive wheels, which makes it possible to provide for a system actuating the normal vehicle brakes by the air brake itself, this comprising no risk of somersaulting or any particular effort on the part of the driver.

A description will now be given of a possible way of adapting an aerodynamic brake to the vehicle according to the invention referring first of all more particularly to FIGS. 9 to 14, it being noteworthy that, in order to avoid complicating the description and drawings to no purpose, only one brake flap will be described, although the vehicle clearly comprises two disposed symmetrically in relation to longitudinal axis $XX_1$.

In accordance with the invention, the transverse contra lifting stabilizer 2G, 2D is used to form, on either side of the vehicle, a main aerodynamic brake flap. To do so, a trapezium shaped portion 26 is cut out of the upper surface wall and articulated on a rear transverse pivot 27 by means of a robust reinforcing framework designated by reference 28. It is immediately clear that flap 26 constituted in this way, when displaced from the position represented by the broken line in FIG. 10 to that represented by a continuous line in the same figure, will expose a braking surface to air displacement whose effect will be the more efficient the higher the speed of the vehicle.

It is clearly understandable that no outside force need be applied to open flap 26. In fact, it suffices, as will be seen in detail subsequently, simply to enable it to be released from its closed position for the action of the relative wind to cause it to open immediately to its maximum position represented in FIG. 10. It should be noted that the depression on the upper surface of the stabilizer clearly favours flap opening.

Figure 9:
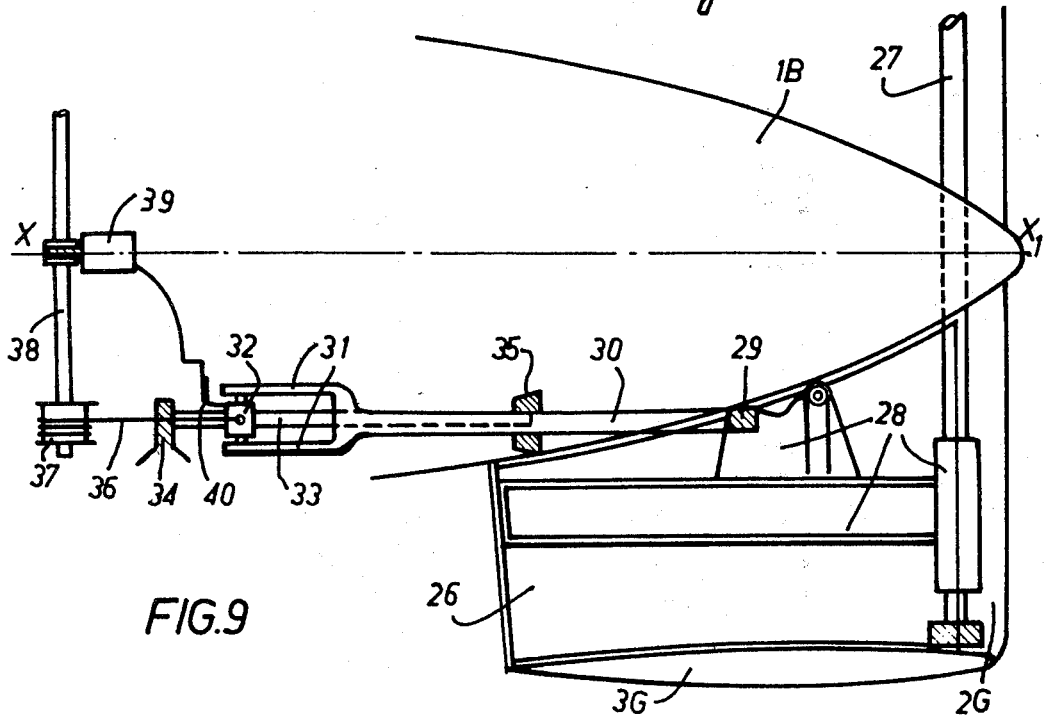
FIGS. 9 and 10 are respectively top and elevation explanatory diagrams representing the principle on which one of the main flaps of the aerodynamic brake functions, the upper wall of said flap being made transparent for clarity.
Figure 10:
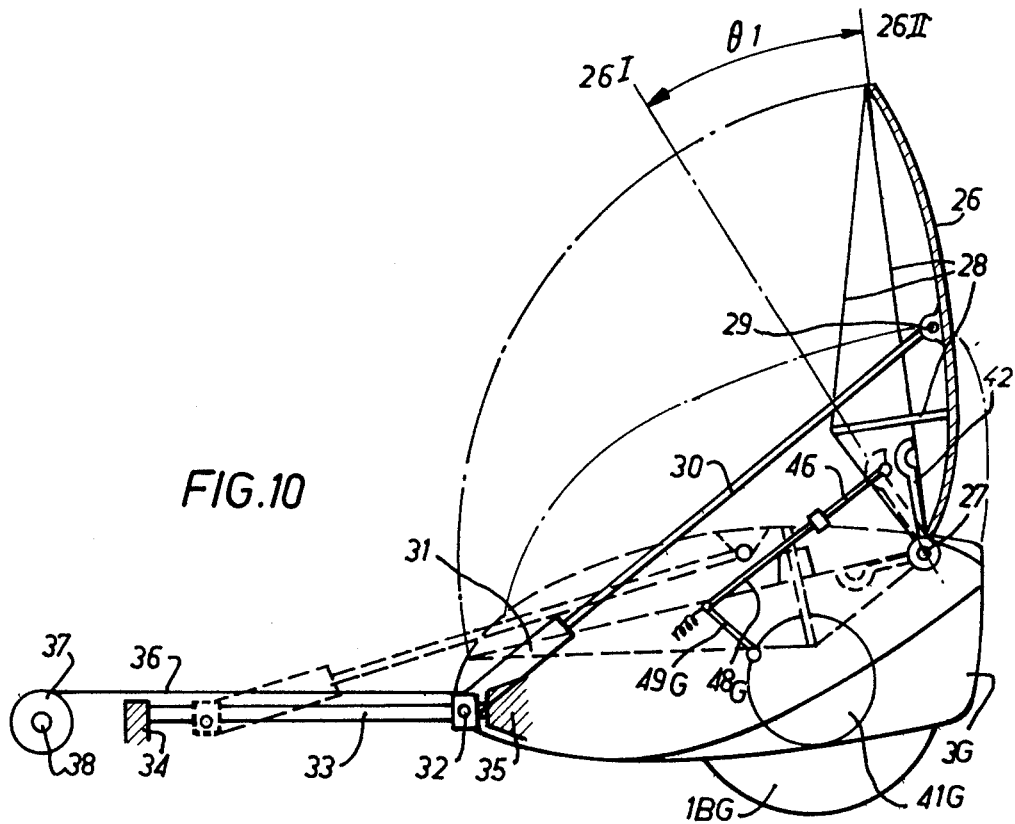

On the other hand, a control system of a possible form of embodiment of which has been represented in FIGS. 9 and 10, is necessary to close the flaps.

Framework 28 comprises a solid fin 29 on which is articulated the rear extremity of a longitudinal control rod 30. The front extremity of the latter comprises a yoke 31 articulated on a slide 32 capable of sliding along the guide rod 33 firmly anchored at both its extremities to two supports 34 and 35 integral with the lower side-member 10G of the box girder P forming the framework of the cockpit.

Slide 32 is connected, by means of a cable 36, to a reel drum 37 mounted on a transverse drive shaft 38 by means of a free-wheel system (not represented) enabling a drive motor 39 to return the slide 32 from its rear position to its forward position and, consequently, to return the brake flap 26 from its open position to its closed position.

The motor 39 is preferably an electric motor actuated by a control button at the disposal of the driver. An electric limit-switch 40 automatically stops motor 39 when slide 32 reaches its forward end position.

Furthermore, drum 37 is provided with an internal braking system (not represented) of any conventional type braking the movement of slide 32 when it is displaced from its forward position to its rear position, during the opening phase of flap 26.

As already seen, use can advantageously be made of the opening of flap 26 to act automatically on the conventional brakes, for example drum brakes, of the vehicle, and on the brake drum 41G in the case in point.

For this purpose (see particularly FIGS. 10, 11 and 12), a lever 42 whose rotation is associated with that of steering wheel 26, as clearly seen in FIG. 10, is articulated in the axis $XX_1$, of the vehicle on fin 27 so that, when displaced from its initial position $42_I$ to its final position $42_{II}$ (see FIG. 11), said lever engages, by its extremity $42_A$ curved for this purpose, with the transverse pin 43 of a yoke 44 elastically carried by a support 45 and causes it to pivot through an angle $\theta$.

This link 44 is connected by a connecting rod 46 to a transverse bar 47, on the two extremities of which are articulated connecting rods 48G and 48D respectively cooperating with the extremities of levers 49G, 49D controlling the two drum brakes 41G and 41D.

It is immediately clear that, when flap 26, under the action of a relative wind, opens and is displaced to position $26_I$ in FIG. 10, lever 42 will at this moment engage pin 43. By passing from position $26_I$ to position $26_{II}$, in which its aerodynamic braking effect is maximized, flap 26 will cause lever 42 to pivot through the same angle $\theta_1$ and, through lever 46, bar 47 and rods 48G, 48D, will actuate drum brakes 41G, 41D, causing control levers 49G, 49D, to pivot through an angle $\theta_2$, causing efficient braking without danger or effort on the part of the driver.

It is quite clear that, as the aerodynamic brake is effective only when the vehicle is travelling at a sufficient high speed, a locking system should be provided to maintain flap 26 in closed position as long as the driver desires.

Figure 13:
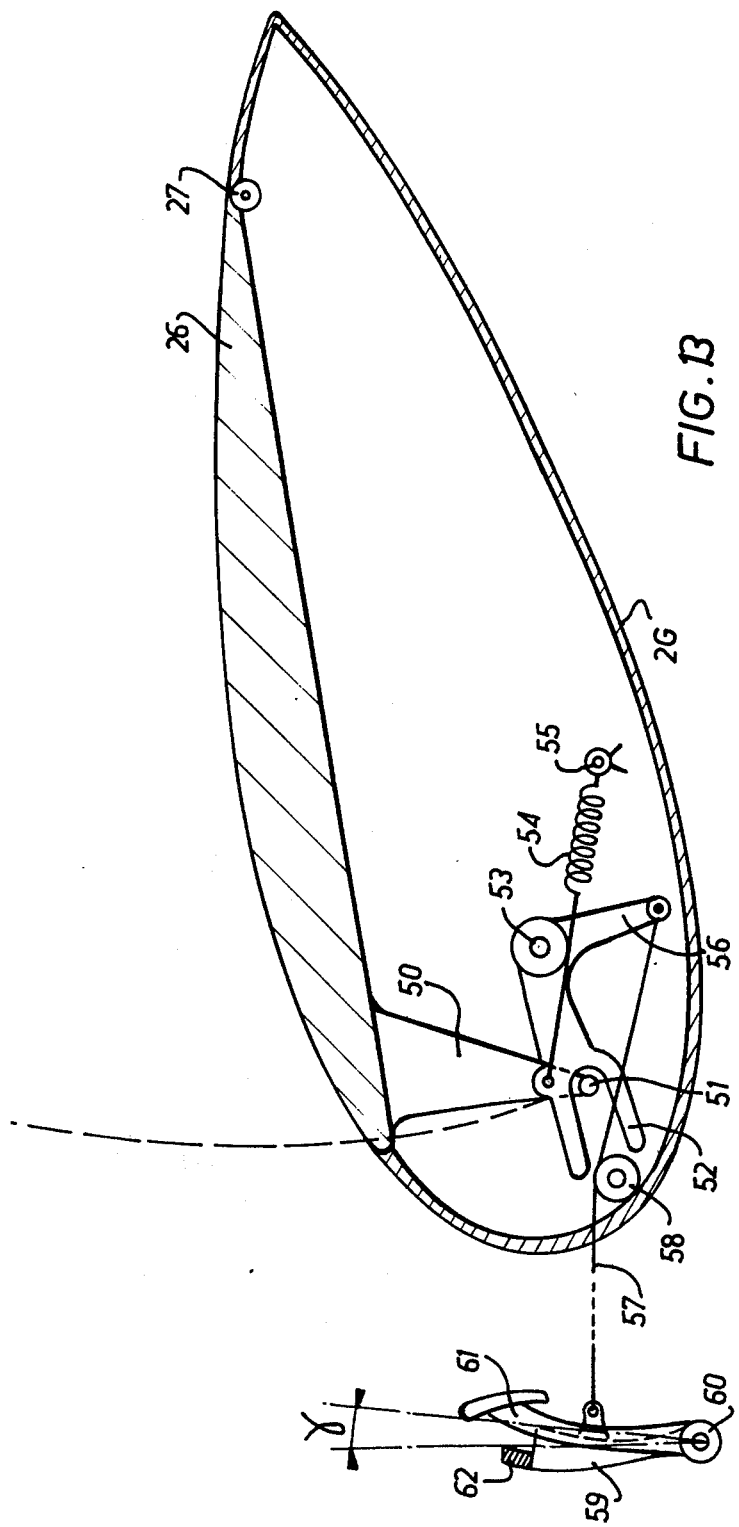
FIGS. 13 and 14 are details representing two different functioning positions for the locking system of one of the main flaps of the aerodynamic brakes on the upper surface of the corresponding profiled shelter.
Figure 14:
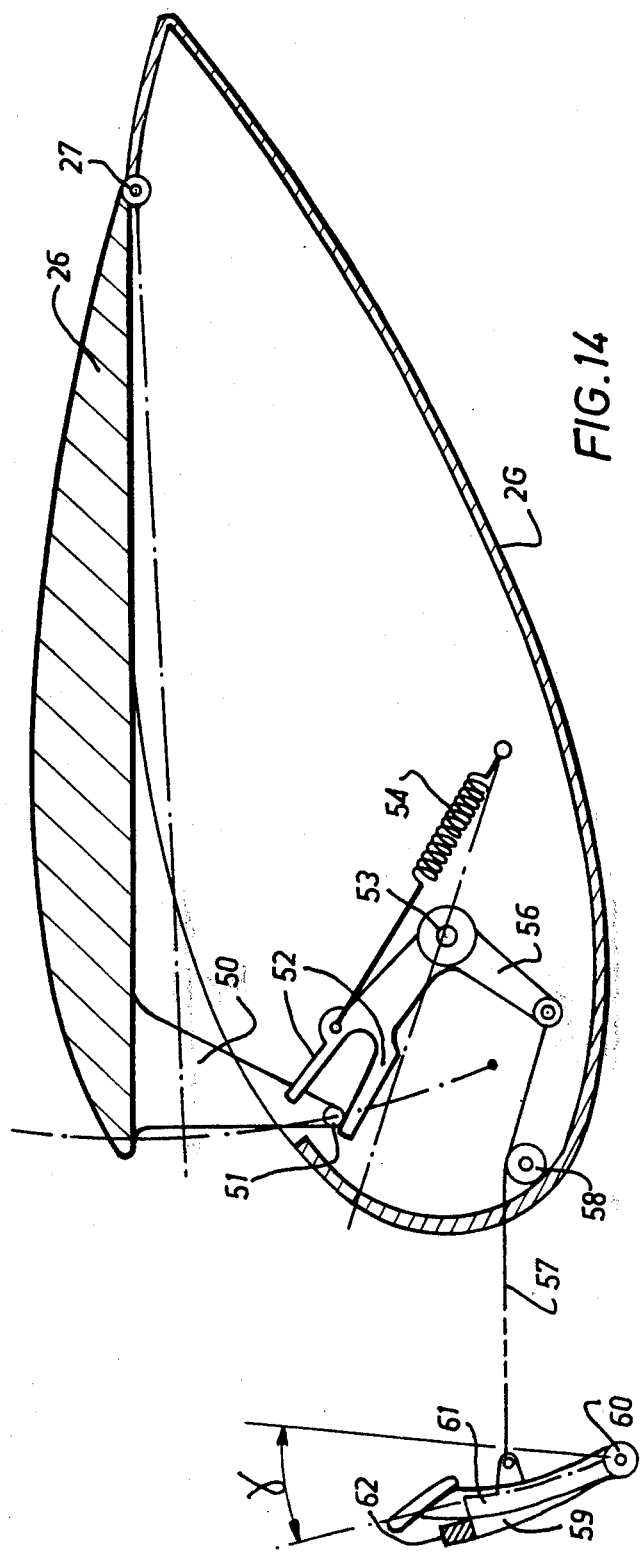

It is possible, for example, to adopt the form of embodiment represented in FIGS. 13 and 14.

Flap 26 comprises at its front extremity a support 50 carrying a pin 51 which, when the flap is in closed position (FIG. 13), is located between the two arms of a supporting fork 52 articulated on a fixed pin 53. An elastic return system 54 interconnecting fork 52 to a fixed point 55 on profiled shelter 2G maintains fork 52 in closed position.

Furthermore, the latter is extended by a substantially orthogonal lever 56. A cable 57 passing over a lazy pulley 58 connects the extremity of lever 56 to a lever 59 having the same pivot pin 60 as pedal 61 actuating the drum brakes of the vehicle and forming therewith an angle $\gamma$ when it is in rest position.

Lever 59 is normally disengaged so that, when the driver depresses pedal 61, this has no effect on said lever 59. A control (not represented) placed at the disposal of the pilot, enables lever 59 to be engaged, when the vehicle is travelling at a high speed, for example over 80 to 100 km/hour, which has the result of pushing out a stop 62 with which it is provided, behind brake pedal 61.

From this moment, it can be seen that when the driver depresses brake pedal 61, the latter when it has pivoted through angle $0\gamma$, causes lever 59 to rotate. The latter then pulls on cable 57, which causes assembly 56-52 to pivot about pin 53. Immediately the spring return system 54 arrives at the level of pin 53, it exerts a bias effect and the pivoting assembly reaches the position represented in FIG. 14 in which flap 26 is slightly open and released. The relative wind then causes flap 26 to open to its maximum position, as already described with respect to FIGS. 9 to 12, giving rise to very energetic aerodynamic braking as well as, at end of travel, the automatic action of the conventional vehicle brakes.

When the vehicle speed has dropped to a value compatible with non-use of the aerodynamic brakes, the flap is returned, by means of the previously described control system, to its closed position. When the flap reaches the position represented in FIG. 14, pin 51 penetrates fork 52 and pivots it to return it to its initial position as represented in FIG. 13, where it is locked immediately the spring return system 54 travels past the median instability position at the level of pin 53.

Quite clearly, the locking system can be actuated by any means other than lever 59. The latter can, in fact, be replaced by a small aerodynamic flap placed at the front of the vehicle and which only moves when it is subjected to sufficient thrust by the relative wind, it being possible to set this thrust, for example, for a vehicle speed in excess of 80–100 km/H.

It is immediately clear (FIG. 17) that, when the two lateral flaps 26G and 26D are in maximum open position, there is a vacuum, set up by the tapered shape of the rear portion of the vehicle, between said flaps and central pin 3C.

Figure 15:
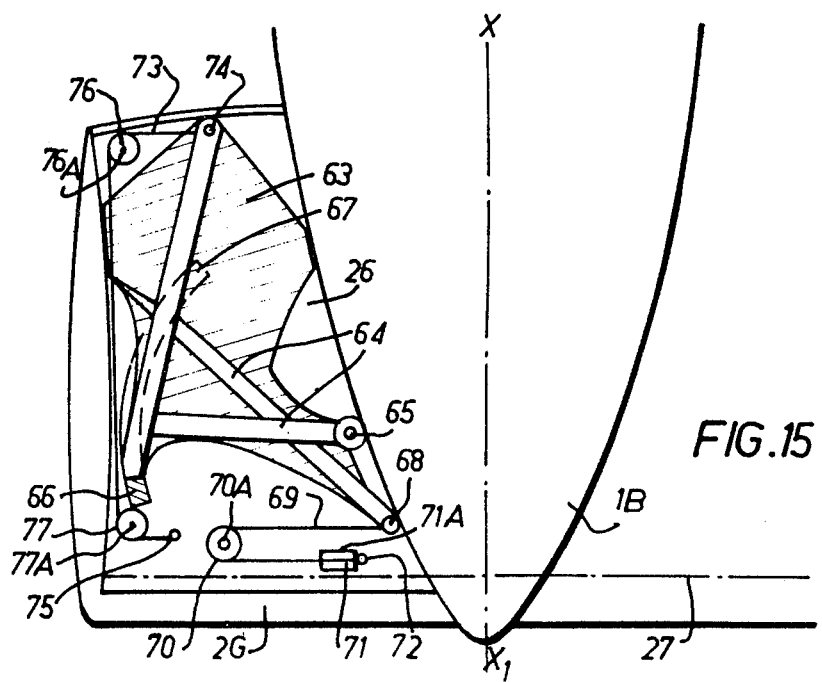
FIGS. 15 and 16 are explanatory diagrams showing, in a simplified manner, how the active area of each main flap of the aerodynamic brakes can be increased by means of a mobile secondary flap, the wall of said flaps being taken as transparent for clarity.
Figure 11:
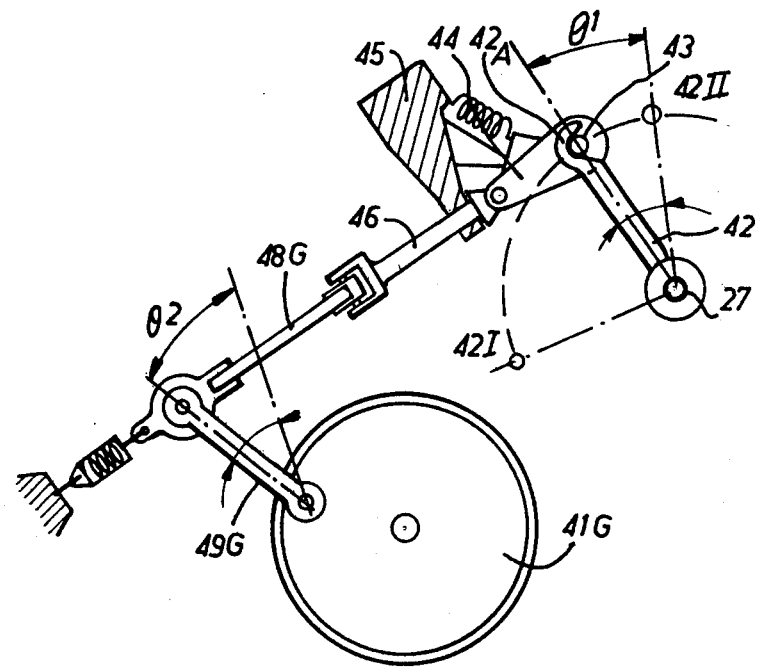
FIGS. 11 and 12 are details representing the system for actuating the conventional brakes by the aerodynamic brakes when the latter reaches end of travel position, an elevation and a top view respectively of the system being represented.
Figure 12:
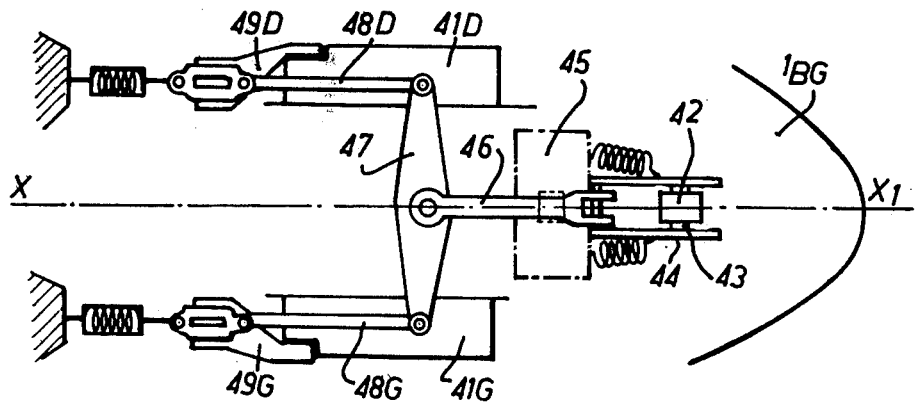
Figure 16:
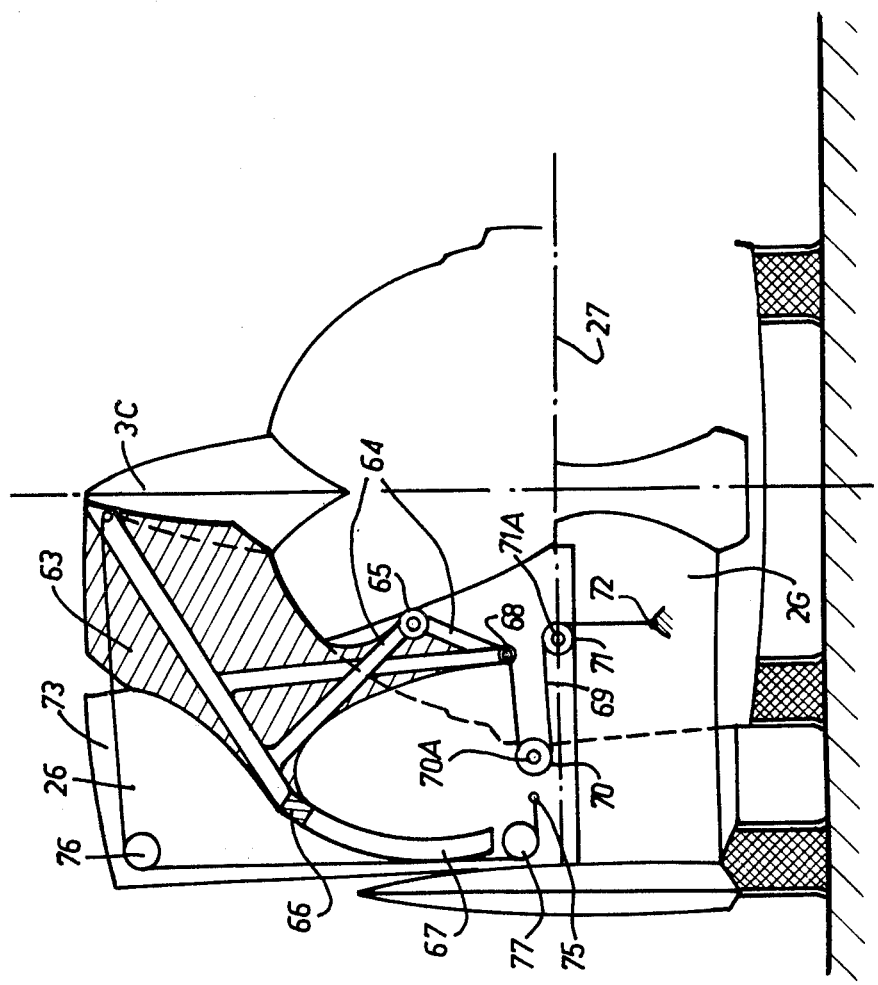
Figure 17:
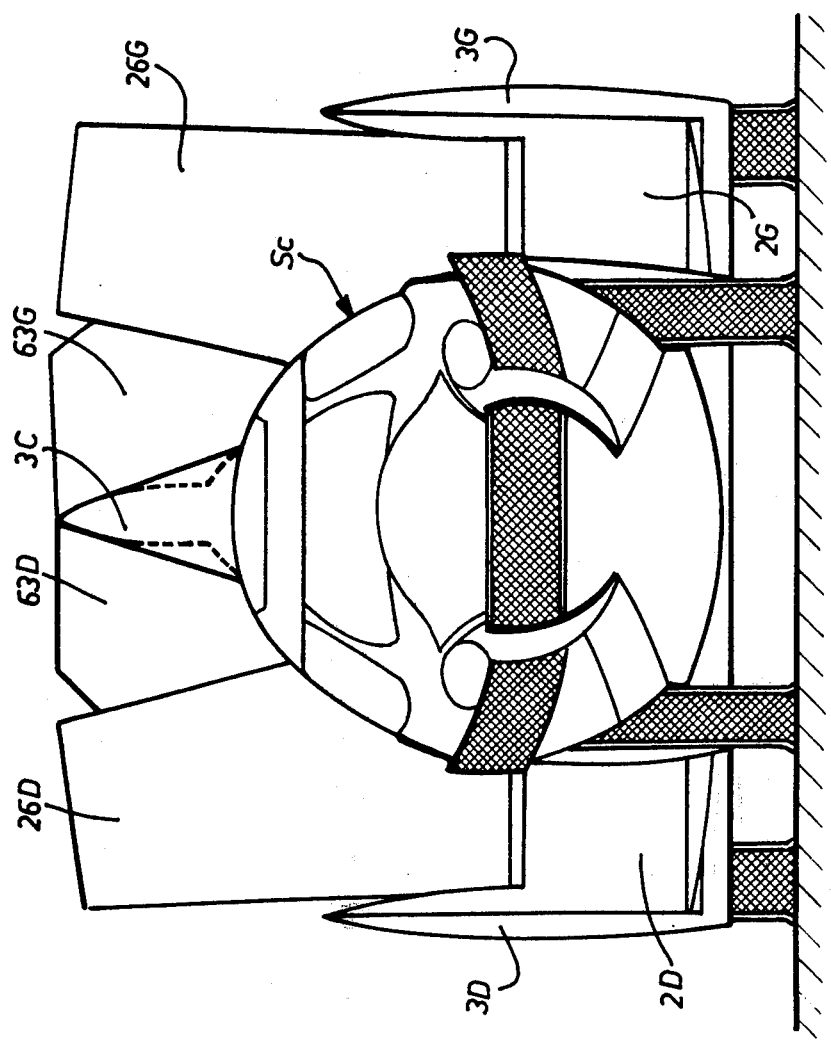
FIG. 17 is a front view of the vehicle according to the invention as it appears in a high speed braking phase, i.e. with its aerodynamic braking system fully extended.

In order to cause the aerodynamic brake to act even more efficiently, each main flap 26G and 26D can advantageously be provided with a laterally pivoting additional flap 63G, 63D, which moves from a fully retracted position inside the corresponding main flap, as represented in FIG. 15, to a fully extended position, as represented in FIG. 16, the pivoting of additional flap 63 being automatically actuated by the pivoting of corresponding main flap 26, thus automatically ensuring complete blocking, as perfectly clear from FIG. 17.

Quite clearly, additional flap 63 matches the shape of the orifice to be blocked. It is attached to a solid tubular armature 64, articulated on a pin 65 integral with the framework 28 of main flap 26.

Furthermore, this armature 64 of flap 63 comprises a roller 66 rolling in a circular guide coaxial with the axis of pivot 65.

In order to synchronize the extension of additional flap 63 with that of main flap 26, an extremely simple cable system such as that diagrammatically represented by way of example in FIGS. 15 and 16 can be used. To the attachment point 68 of mobile armature 74, which is offset in relation to the pivot 65, is attached the extremity of a cable 69 of fixed length which, after passing over a first lazy pulley 70 mounted on a pin $70_A$ integral with the main flap 26, and over a second lazy pulley 71 the pivot $71_A$ of which is integral with the fixed portion of appendix 2G, is attached by its other extremity to a fixed attachment point 72 of appendix 2G.

It is immediately clear that if, with the main flap in closed position and the additional flap 63 in retracted position as represented in FIG. 15, the driver actuates brake pedal 61 to release the main flap 26 in the way previously described with respect to FIGS. 13 and 14, said main flap 26 will open under the effect of the relative wind to reach the fully open position represented in FIG. 10 and cause the extension of the additional flap, as in proportion as main flap 26 pivots about pin 27, pulley 70 itself pivots about the same pin. Now, pin $70_A$ of pulley 70 is disposed in relation to pin 27 and fixed pin $71_A$ of pulley 71 in such a way that, when said pulley 70 pivots, its distance in relation to fixed point 72 to which cable 69 is attached increases. As the latter is of constant length, it is consequently clear that, under the tensile stress applied by pulley 70, it causes the additional flap 63 to pivot about its pin 65 to bring it to the expanded position in FIG. 16.

In order to return the additional flap 63 to its retracted position inside the main flap 26, when the latter returns to its initial position, a spring return system is provided.

According to a particularly simple form of embodiment represented in FIGS. 15 and 16, this return system can be constituted by a single elastic cable of the "sandow" type fixed, at one of its extremities, to an attachment point 74 integral with armature 64 of flap 63 and, at its other extremity, to an attachment point 75 integral with the main flap 26 and passing over two lazy pulleys 76 and 77 whose pivot pins $76_A$ and $77_A$ are also integral with the armature of main flap 26.

It is immediately clear that, when the additional flap 63 moves from its retracted position as shown in FIG. 15 to its extended position as represented in FIG. 16, the elastic cable 73 is compelled to elongate, clearly applying tensile stress to mobile flap 63. Immediately the latter is not longer subject to the tensile stress of cable 69, mobile flap 63 is automatically returned to its initial retracted position in proportion as the main flap 26 itself returns to its initial position.

Quite clearly, as distinctly illustrated in FIG. 17, the vehicle comprises a double aerodynamic braking system, a set of two flaps 26D, 63D in the case in point, opening between lateral fin 3D and a central fin 3C and a set of two flaps 26G, 63G, opening between lateral fin 3G and central fin 3C.

It has already been seen that the driver could, as he chose, give the vehicle a ground clearance selected from six options by actuating a special control at his disposal.

Furthermore, it is well known that the young drivers for whom the vehicle according to the invention is particularly intended, tend to approach curves or bends very quickly owing to the fact that the motorcycles that they drive can be inclined to balance the effect of the centrifugal force.

According to the invention, the principle of adjustable suspension described in the applicant's U.K. patent No. 1,240,147 and U.S. Pat. No. 3,539,030 previously mentioned, which enables the vehicle to be caused to lean towards the inside of the bends in order to cancel out the effect of the centrifugal force, is applied to the vehicle by adaptation.

For this purpose, (see FIGS. 18 and 19), steering wheel 80 comprises on its rim two pressure actuated control buttons 81G and 81D disposed in such a way that the driver can reach them selectively with his left or right thumb, without having to release the steering wheel.

Figure 18:
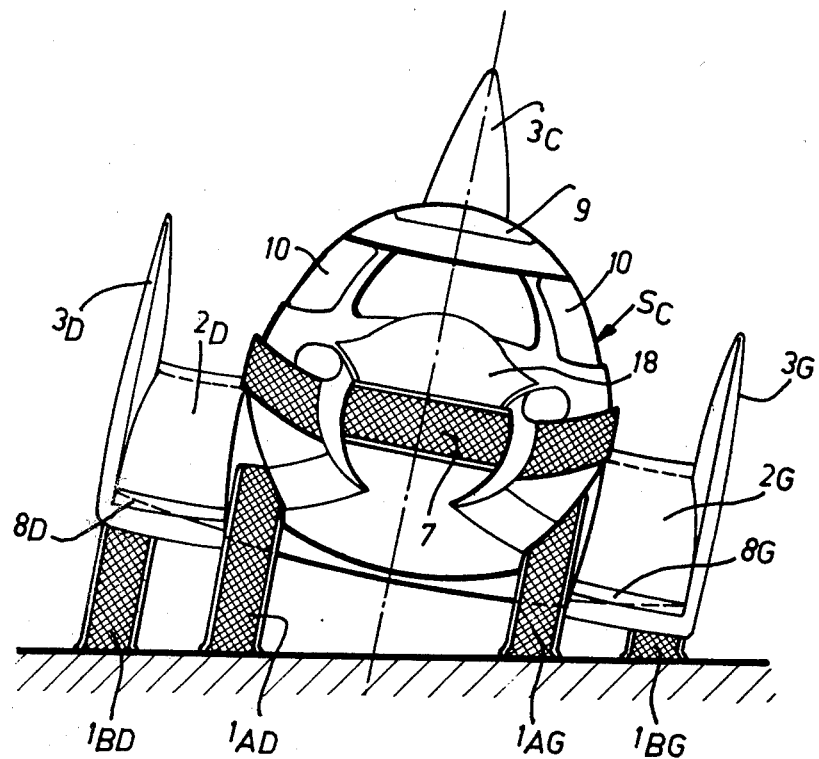
FIG. 18 is a front view of the vehicle in the position inclined towards the inside of the bend that it can occupy in order to cancel out the effects of centrifugal force.
Figure 19:
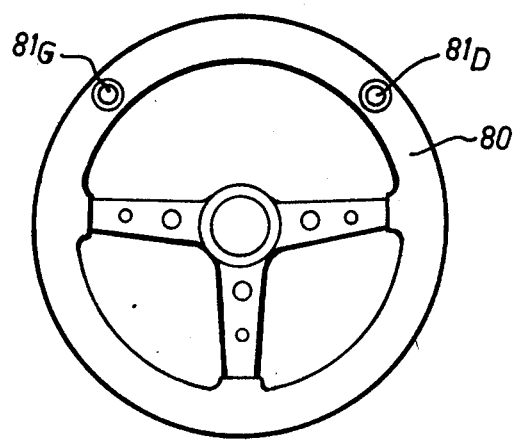
FIG. 19 is a larger scale detail representing the steering wheel provided with its suspension control buttons.

For a left-hand bend, for example as represented in FIG. 18, the driver depresses button $81_G$ with his thumb on entering the bend, which has the result of varying the position of each of the four wheels so that they occupy the respective corresponding positions in said FIG. 18. In the case in question, only the front left-hand wheel 1AG does not have to change position in relation to its initial position.

On the other hand, the ground clearance for the left rear wheel 1BG decreases while this ground clearance increases both for the front and rear right-hand wheels 1AD, 1BD.

The suspension assembly is automatically reset when the steering wheel returns to its neutral position.

It goes without saying that this control can be designed in any appropriate known manner, preferably in accordance with the technique described in the above mentioned patents filed by the Applicant.

It goes without saying, moreover, that the present invention has been described and represented only by way of a preferred example of embodiment and that any equivalent means can be added to its constituents without forasmuch departing from the scope of said invention as defined in the following claims.

I claim:

1. A lightweight high performance vehicle affording a great degree of security comprising
    a tapered cockpit with a well rounded forward portion both in the horizontal and in the vertical plane;
    a profiled transverse horizontal appendix extending from both sides of the rear of said cockpit;
    two front wheels at the front portion of said cockpit;
    two rear wheels detached from said cockpit and housed at the two extremities of said profiled transverse appendix and forming therewith a transverse horizontal stabilizer;

three vertical stabilizers forming fins disposed respectively above said cockpit and at the two extremities of said transverse stabilizer;
and an aerodynamic brake including
a transverse pin located at the rear of said horizontal appendix,
flaps capable of pivoting on said transverse pin, under control of the driver, when the speed of the vehicle is sufficient for aerodynamic brake action to be efficient,
additional flaps contained inside said aerodynamic brake flaps and capable of pivoting laterally and automatically in proportion as said brake flaps pivot towards their fully open position so that, when the latter is reached, the space between said brake flaps and said central fin disposed above said cockpit is substantially completely blocked by said additional flaps.

2. Vehicle according to claim 1, wherein the synchronization between the pivotal movements of said brake flaps around said rear transverse pin and the lateral pivoting movements of said additional flaps is ensured by a fixed length cable connection for the extension phase and by an elastic cable connection for the retraction phase.

3. A lightweight high preformance vehicle affording a great degree of security comprising
a tapered cockpit with a well rounded forward portion both in the horizontal and in the vertical plane;
a profiled transverse horizontal appendix extending from both sides of the rear of said cockpit;
two front wheels at the front portion of said cockpit;
two rear wheels detached from said cockpit and housed at the two extremities of said profiled transverse appendix and forming therewith a transverse horizontal stabilizer;
three vertical stabilizers forming fins disposed respectively above said cockpit and at the two extremities of said transverse stabilizer;
and an aerodynamic brake including
a transverse pin located at the rear of said horizontal appendix,
flaps capable of pivoting on said transverse pin, under control of the driver, when the speed of the vehicle is sufficient for aerodynamic brake action to be efficient,
said flaps each being constituted by a wall of the upper surface of said transverse appendix located on each side of said cockpit and provided with a reinforcing frame which is articulated on said transverse pin so that said flaps can occupy a fully open substantially vertical position in the aerodynamic braking phase,
said aerodynamic brake flaps being normally maintained in a closed position by a mechanical locking device having a two-position pivoting lever which, when actuated, causes the leading portion of the flaps to lift slightly and enables the relative wind to open the forward edge and pivot said flap about said transverse pin on its rear edge and bring said flap automatically to the fully open aerodynamic braking position.

4. Vehicle according to claim 3, wherein the aerodynamic brake flaps are returned from their fully open position to their closed position by means of a mechanical rod and slide system subjected to the action of a control system which is motive in the flap closure direction and has a braking effect in the opening direction of said flaps.

5. Vehicle according to claim 3, wherein the aerodynamic brake flaps comprise a lever which, at the end of the opening travel of said flaps, engages a rod type connection system actuating the conventional rear brakes of the vehicle.

* * * * *

UNITED STATES PATENT OFFICE
CERTIFICATE OF CORRECTION

Patent No. 3,934,668　　　　　　　　　Dated　January 27, 1976

Inventor(s)　JACQUES-JEAN-MARIE JULES GERIN

It is certified that error appears in the above-identified patent and that said Letters Patent are hereby corrected as shown below:

Delete Item [30] reading:

Foreign Application Priority Data

May 5, 1972　　France............72.16157

Signed and Sealed this eleventh Day of May 1976

[SEAL]

Attest:

RUTH C. MASON
Attesting Officer

C. MARSHALL DANN
Commissioner of Patents and Trademarks